United States Patent [19]

Brink et al.

[11] Patent Number: 5,750,635
[45] Date of Patent: May 12, 1998

[54] THERMALLY STABLE POLYESTERS FORMED UTILIZING ANTIMONY COMPOUNDS AS CATALYSTS

[76] Inventors: Andrew Edwin Brink, 1401 University Blvd., F10, Kingsport, Tenn. 37660; Wayne Payton Pruett, 101 Walton Ct.; Clinton Cherry, 500 White Oak La., both of Kingsport, Tenn. 37663; Kay Hunt Shackelford, 206 Brandonwood Dr., Johnson City, Tenn. 37604

[21] Appl. No.: 761,153

[22] Filed: Dec. 6, 1996

Related U.S. Application Data

[62] Division of Ser. No. 760,830, Dec. 5, 1996, which is a continuation of Ser. No. 557,758, Nov. 13, 1995.

[51] Int. Cl.[6] .................................................. C08G 63/78
[52] U.S. Cl. ................... 528/285; 528/285; 528/286; 528/288; 528/289; 528/290; 528/292; 528/295; 528/298; 528/302; 528/307; 528/308; 528/308.6; 524/706; 524/779
[58] Field of Search ........................ 528/285, 286, 528/288, 289, 290, 292, 295, 298, 302, 307, 308, 308.6; 524/706, 779

[56] References Cited

U.S. PATENT DOCUMENTS

| | | | |
|---|---|---|---|
| 2,641,592 | 6/1953 | Hofrichter, Jr. | 260/75 |
| 2,731,476 | 1/1956 | Peter et al. | 260/371 |
| 3,028,366 | 4/1962 | Engle, Jr. | 260/75 |
| 3,441,540 | 4/1969 | Müller et al. | 260/75 |
| 3,567,799 | 3/1971 | Prevorsek | 260/860 |
| 3,651,016 | 3/1972 | Hrach et al. | 260/75 |
| 3,732,182 | 5/1973 | Chimura et al. | 260/75 |
| 3,918,976 | 11/1975 | Arai et al. | 96/84 |
| 4,359,580 | 11/1982 | Grasso | 549/79 |
| 4,403,092 | 9/1983 | Davis et al. | 528/290 |
| 4,420,581 | 12/1983 | McFarlane et al. | 524/431 |
| 4,499,226 | 2/1985 | Massey et al. | 524/382 |
| 4,501,878 | 2/1985 | Adams | 528/286 |
| 4,745,174 | 5/1988 | Pruett et al. | 528/289 |
| 4,790,581 | 12/1988 | Boswell et al. | 292/264 |
| 4,999,418 | 3/1991 | Krutak et al. | 528/272 |
| 5,017,680 | 5/1991 | Sublett | 528/274 |
| 5,372,864 | 12/1994 | Weaver et al. | 428/36.92 |
| 5,384,377 | 1/1995 | Weaver et al. | 525/437 |

OTHER PUBLICATIONS

Kamatani et al., "Effect of Phosphoric Acid on the Polycondensation of Bis(2–hydroxyethyl) Terephthalate Catalyzed by Sb(III) Compounds", Polymer Journal, 1980, vol. 12, No. 2, pp. 125–130.

Devaux et al, Makromol. Chem. 179, 2201–2209, (1978).

*Primary Examiner*—Samuel A. Acquah
*Attorney, Agent, or Firm*—Betty J. Boshears; Harry J. Gwinnell

[57] ABSTRACT

This invention relates to a thermally stable polyester, comprising:

a polyester resin prepared by adding a dicarboxylic acid to a glycol compound, said dicarboxylic acid selected from the group consisting of aliphatic dicarboxylic acids having a total of from 3 to 16 carbon atoms, alicyclic dicarboxylic acids having 7 to 12 carbon atoms, aromatic dicarboxylic acids containing a total of from 8 to 16 carbon atoms, and combinations thereof, and wherein said glycol is selected from the group consisting of glycols having from 2 to 12 carbon atoms, glycol ethers having from 4 to 12 carbon atoms, and combinations thereof, said polyester resin having been prepared in the presence of a catalyst system consisting essentially of one or more antimony compounds which is not reacted with α-hydroxy carboxylic acids, α,β-dicarboxylic acids or derivatives thereof.

66 Claims, No Drawings

THERMALLY STABLE POLYESTERS FORMED UTILIZING ANTIMONY COMPOUNDS AS CATALYSTS

This is a divisional application of application Ser. No. 08/760,830, filed Dec. 5, 1996 which is a file wrapper continuation of Ser. No. 08/577,758 which was filed on Nov. 13, 1995.

FIELD OF THE INVENTION

This invention concerns thermally stable polyester resins prepared in the presence of a catalyst system consisting essentially of an antimony compound without the necessity of stabilizers or other metal catalysts.

BACKGROUND OF THE INVENTION

Traditionally, the synthesis of polyesters requires the use of catalysts to provide a sufficient rate of reaction to be commercially viable. Often, however, the catalysts that encourage the forward polymerization reaction also enhance the rates of degradation reactions. These degradation reactions can result in both an increase in color and a decrease in molecular weight. To minimize these unfavorable side reactions, stabilizing agents such as phosphorus compounds are traditionally added to the reaction mixture. It is believed in the art that such a stabilizer is needed to prepare a material with acceptable color and thermal stability.

For example, a common commercial catalyst in the synthesis of polyesters is titanium. Titanium is an extremely active catalyst and requires the addition of phosphorus compounds to provide acceptable thermal stability as well as improve the color. Antimony is also known as a catalyst in the synthesis of polyesters. Although antimony is a less active catalyst than titanium, the art teaches the addition of phosphorus compounds to provide acceptable thermal stability as well as to improve the color.

In the production of commercial polyesters, even when phosphorus is added, the polymer formed is typically unacceptably yellow in color. This yellow color is often toned out using bluing agents, such as cobalt compounds, to make it acceptably neutral in color for commercial applications. Cobalt compounds, besides being bluing agents, are also known to possess catalytic activity for polyester polymerization and degradation reactions. Therefore, the use of cobalt compunds requires an increase in the amount of the phosphorus compound utilized.

Although the art teaches that phosphorus compounds are necessary, they are often relatively expensive, require additional capital equipment for their addition to a typical commercial continuous polycondensation reactor, as well as, in some cases, increase the level of particulate haze in the prepared polyester.

In fact, U.S. Pat. No. 3,028,366 to Engle et al. teaches that it is necessary to add a pentavalent phosphorus compound to the polymerization reaction to prevent a discolored polymer. Also, Kamatani et al, (Polymer Journal, Volume 12, No. 2, pp 125–130) discloses the stabilizing effect of phosphoric acid on the polymerization of poly(ethylene terephthalate) by Sb(III) compounds.

Several other patents teach the necessity of a phosphorus stabilizer in polyester synthesis for the purpose of obtaining acceptable color and thermal stability. These patents include U.S. Pat. No. 4,501,878 to Adams, U.S. Pat. No. 3,567,799 to Prevorsek, U.S. Pat. No. 5,017,680 to Sublett, U.S. Pat. No. 4,499,226 to Massey, and U.S. Pat. No. 3,441,540 to Muller et al.

U.S. Pat. No. 3,651,016 to Hrach et al. relates to the synthesis of polyesters in the absence of a phosphorus stabilizer. However, this patent teaches the method of using metal alloys as catalysts.

U.S. Pat. No. 3,732,182 to Chimura et al. relates to the synthesis of novel antimony compounds that do not undergo an undesirable reduction reaction. This article is not pertinent in that it reacts traditional antimony compounds with $\alpha$-hydroxycarboxylic acid, $\alpha,\beta$-dicarboxylic acid or certain derivatives thereof to formulate allegedly novel antimony compounds.

U.S. Pat. No. 4,499,226 to Massey et al. relates to high clarity, colorless, antimony catalyzed polyesters based on terephthalic acid reacted with polyhydric alcohols. This article also requires a stabilizer to prevent color and degradation side reactions. This article also discloses cobalt as a bluing agent.

At present, in order to improve the apparent whiteness of polyester fibers or neutral color characteristics of polyester plastics, toners can be incorporated into the polyester to mask or neutralize the yellow color.

Cobalt acetate is one of the most widely used toners in the industry to mask the yellow color of polymers. However, cobalt acetate has a number of noteworthy disadvantages. For example, cobalt acetate toned materials tend to be unstable during storage and are particularly susceptible to temperature and humidity, and tend to undergo an undesirable color shift toward yellow. Further, when high cobalt concentrations are needed to mask the yellow color of some polymers there is a tendency to impart a gray color to the polymer.

Another disadvantage in the use of cobalt acetate is the limitation set by various governmental agencies in the level of cobalt deemed allowable in polyester catalyst systems.

Further, cobalt has a strong tendency to form insoluble residues in manufacturing process equipment, thereby leading to production problems.

Lastly, cobalt salts tend to lower the resulting polymer's thermal stability and to increase acetaldehyde formation in poly(ethylene terephthalate).

U.S. Pat. No. 2,641,592 discloses polyesters containing dimethyl terephthalate with cobalt acetate and antimony.

U.S. Pat. No. 4,745,174, discloses certain 1-cyano-3H-dibenz[f,ij]isoquinoline-2,7-diones which are useful as organic toners for polyester fibers and plastics and which solve many of the aforementioned problems. These compounds, however, are expensive to manufacture and provide environmental, safety, and provide toxicological concerns relative to their manufacture and use.

U.S. Pat. No. 4,403,092 discloses colorants useful in the practice of this invention. However, no mention is made in the patent regarding the potential utility of the disclosed compounds as components to produce a good toner system for the polyesters of the invention.

Certain organic toner dyes have been disclosed in U.S. Pat. Nos. 5,372,864; 5,384,377; and 4,745,174. One or more of these patents disclose the use of certain organic toner dyes for use in polyesters generally. No mention was made of a system comprising essentially antimony.

For these reasons, a polyester without the addition of stabilizing phosphorus compounds could be particularly advantageous if they could be prepared with equivalent or improved thermal stability and color.

SUMMARY OF THE INVENTION

This invention relates to a thermally stable polyester resin having been prepared in the presence of a catalyst system, consisting essentially of an antimony compound wherein the polyester resin is prepared by adding a dicarboxylic acid to a glycol compound. A thermal stabilizer is not necessary in the preparation of this polyester.

More particularly, this invention relates to a thermally stable polyester, comprising a polyester resin, the polyester resin made by adding a dicarboxylic acid to a glycol compound, the carboxylic acid selected from the group consisting of aliphatic dicarboxylic acids having a total of from 3 to 16 carbon atoms, alicyclic dicarboxylic acids having 7 to 12 carbon atoms, aromatic dicarboxylic acids containing a total of from 8 to 16 carbon atoms, and combinations thereof, and wherein the glycol is selected from the group consisting of glycols having from 2 to 12 carbon atoms, glycol ethers having from 4 to 12 carbon atoms, and combinations thereof, where the polyester resin has been prepared in the presence of a catalyst system consisting essentially of an antimony compound.

Further, this invention relates to a method for imparting good thermal stability to polyesters without the need for stabilizers by employing the catalyst system described above.

This invention even further relates to the use of organic dyes in the polyester compositions and in the methods of the present invention.

This invention provides the advantages of good thermal stability without the need for stabilizers. It also provides this improved thermal stability in combination with good color for the polyesters described.

DETAILED DESCRIPTION OF THE INVENTION

This invention relates to a thermally stable polyester, comprising a polyester resin where the polyester resin is prepared by adding a dicarboxylic acid to a glycol compound in the presence of a catalyst system consisting essentially of an antimony compound.

By the term "consisting essentially of", it is meant that other compounds including thermal stabilizers may be used, but not in catalytic amounts. By "catalytic amounts", it is meant that the antimony compound must be present in an amount of about 5 ppm to 400 ppm, more preferably, from about 5 ppm to 300 ppm, even more preferably, 165 to 250 ppm, and even more preferably, 175 to 200 ppm. Other compounds besides the antimony compounds may be present in non-catalytic amounts, such as from 0.1 to to 5 ppm in the polyester compositions of the invention. The term "consisting essentially of antimony" specifically excludes phosphorus-based stabilizers except in non-catalytic amounts. Examples of phosphorus-based stabilizers are phosphorus, phosphates, phosphites, phosphoric acid and phosphonites. The term "consisting essentially of antimony" also specifically excludes compounds of titanium, zinc, cobalt, manganese, nickel, germanium and magnesium except in non-catalytic amounts.

By the term "catalyst system", we mean compounds used in the process of making the polyester which possess any degree of catalytic activity.

The polyesters referred to herein include thermoplastic, crystalline or amorphous polyesters produced by conventional polymerization techniques from one or more diols and one or more dicarboxylic acids. The polyesters normally are molding or fiber grade and have an inherent viscosity (I.V.) of about 0.4 to about 1.2 (dL/g) measured at 25° C. in a 60/40 ratio by weight of phenol/tetrachloroethane.

The dicarboxylic acid may be selected from the group consisting of aliphatic dicarboxylic acids having a total of from 3 to 16 carbon atoms, alicyclic dicarboxylic acids having 7 to 12 carbon atoms, aromatic dicarboxylic acids containing a total of from 8 to 16 carbon atoms, and combinations thereof. The glycol may be selected from the group consisting of glycols having from 2 to 12 carbon atoms, glycol ethers having from 4 to 12 carbon atoms, and combinations thereof.

The term "aliphatic-dicarboxylic acid" is used to denote straight or branched chain alkanedicarboxylic acids containing 3 to 16 carbons. Typical aliphatic dicarboxylic acid include succinic acid, glutaric acid, adipic acid, sebacic acid, suberic, 2,2,4-trimethyladipic, 1,12-dodecanedioic acid and the like.

The term "alicyclic dicarboxylic acid" is used to denote cycloalkane dicarboxylic acids which contain a total of 7 to 12 carbon atoms preferably 1,2-, 1,3- and 1,4-cyclohexanedicarboxylic acids.

The term "aromatic dicarboxylic acid" is used to denote dicarboxylic acid derivatives of benzene, naphthalene, biphenyl, diphenylether, diphenylsulfone and these substitutes with $C_1$-$C_4$ alkyl or halogen (fluorine, chlorine, bromine or iodine). Typical aromatic dicarboxylic acids, include terephthalic acid, isophthalic acid, phthalic acid, 1,4-naphthalene dicarboxylic acid, 2,6-naphthalenedicarboxylic, 4,4'-biphenyldicarboxylic acid, 2-bromoterephalic acid, 2,5-dibromoterephthalic acid, tetrachlorophthalic acid and the like. Terephthalic acid, isophthalic acid and 2,6-naphthalenedicarboxylic acid are the preferred aromatic dicarboxylic acids.

Suitable diol components of the described polyesters may be selected from ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, Z,8-bis(hydroxymethyl)-tricyclo-[5.2.1.0]-decane wherein Z represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms.

Preferred polyesters comprise at least about 50 mole percent terephthalic acid residues and at least about 50 mole percent ethylene glycol and/or 1,4-cyclohexanedimethanol residues. Particularly preferred polyesters are those containing from about 75 to 100 mole percent terephthalic acid residues and from about 65 to 100 mole percent ethylene glycol residues. More particularly, preferred polyesters are those containing from about 90 to 100 mole percent terephthalic acid residues and from about 85 to 100 mole percent, preferably 90 to 100 mole percent ethylene glycol residues. Also, particular preferred polyesters are those containing from about 90 to 100 mole percent terephthalic acid and 65 to 75 mole percent ethylene glycol.

The polyesters from this invention are necessarily made from the dicarboxylic acids themselves, not the equivalents to these dicarboxylic acids. For instance, polyesters made from diesters such as dimethylterephthalate do not form any part of the present invention.

The polyesters may be prepared according to polyester forming conditions well known in the art. For example, a mixture of one or more dicarboxylic acids, preferably aromatic dicarboxylic acids, and one or more diols may be heated in the presence of esterification and/or polyesterification catalysts at temperatures in the range of about 150° to about 300° C., and pressures of atmospheric to about 0.2 mm Hg. Normally, the dicarboxylic acid is esterified with the diol(s) at about to 10 to 110 psi, preferably 20 to 60 psi above atmospheric pressure and at a temperature at the lower end of the specified range. Polycondensation then is effected by increasing the temperature and lowering the pressure while excess diol is removed from the mixture.

A preferred temperature range for a polyester condensation is about 225° C. to about 300° C.

It is preferred in the cases of polyester containing greater than 5 mole % 1,4-cyclohexanedimethanol, based on the glycol components being present at a total of 100 mole percent, that the polycondensation reaction time is less than 8 hours, preferably less than 4.0 hours and more preferably less than 3.0 hours.

In a preferred embodiment, organic dyes are useful in the polyesters of the invention. Preferred dyes are ones falling within the classes of anthraquinones and anthrapyridones.

When the dyes of the invention are used as toners, this means that it is used in an amount sufficient to improve the apparent whiteness of the polyester. This amount is generally from about 0.1 to 10 ppm. These dyes can also used in an amount sufficient to impart a substantial amount of color to the polyester. If color is intended to be imparted to the polyester, the dye should be present in an amount greater than 10 ppm.

Typical organic toner dyes which are useful in the practice of this invention are those disclosed in U.S. Pat. Nos. 5,372,864; 5,384,377; and 4,745,174. Particularly preferred dyes are ones described in U.S. Pat. No. 5,384,377, incorporated herein by reference. These preferred dyes are certain blue substituted 1,4-bis(2,6-dialkylanilino)anthraquinones in combination with selected red anthraquinone and anthrapyridone(3H-dibenz[fi,j]isoquinoline-2,7-dione) compounds. These dyes which provide a toner system useful in imparting a desirable neutral to slightly blue hue to polyesters having a yellow appearance. The thermally stable colored compounds have reactive groups and can be incorporated into the polyester polymer structure during polymerization.

In this preferred embodiment, a major portion of at least one 1,4-bis(2,6-dialkylanilino)anthraquinone(s) of formula (I) is used:

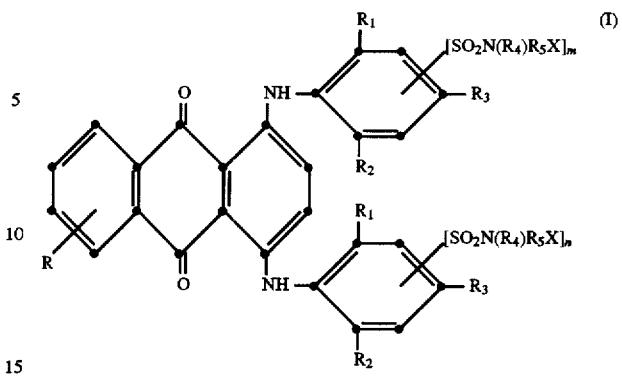

wherein:

R is selected from the group consisting of hydrogen, $C_1$–$C_6$ alkyl, halogen, carboxy, and

$R_1$ and $R_2$ are independently $C_1$–$C_6$-alkyl;

$R_3$ is selected from the group consisting of hydrogen, halogen, $C_1$–$C_6$-alkyl, substituted $C_1$–$C_6$ alkyl, hydroxy, $C_1$–$C_6$-alkoxy, substituted $C_1$–$C_6$-alkoxy, cyano, thiocyano, $C_1$–$C_6$-alkylthio, substituted $C_1$–$C_6$-alkylthio, $C_1$–$C_6$-alkylsulfonyl, substituted $C_1$–$C_6$-alkylsulfonyl, $C_1$–$C_6$-alkoxycarbonyl, carboxy, aryloxy, arylthio, arylsulfonyl, and $SO_2N(R_4)R_5X$ when m and/or n are zero;

$R_4$ is selected from the group consisting of hydrogen, $C_1$–$C_6$-alkyl, substituted $C_1$–$C_6$-alkyl, $C_3$–$C_8$-alkenyl, $C_3$–$C_8$-alkynyl, $C_3$–$C_7$-cycloalkyl and aryl;

$R_5$ is a linking group selected from the group consisting of $C_1$–$C_8$-alkylene, $C_1$–$C_6$-alkylene-Z—$C_1$–$C_6$-alkylene, arylene-$C_1$–$C_6$-alkylene, arylene-Z—$C_1$–$C_6$-alkylene, $C_3$–$C_7$-cycloalkylene, $C_1$–$C_6$-alkylene-cycloalkylene-$C_1$–$C_6$-alkylene, $C_1$–$C_6$-alkylene-arylene-$C_{1-C6}$-alkylene, and $C_1$–$C_6$-alkylene-Z-arylene-Z—$C_1$–$C_6$-alkylene, wherein Z is selected from —O—, —S— or $SO_2$;

X is hydrogen or a polyester reactive group; and m and n are independently 0 or 1; with the proviso that at least one polyester reactive group is present.

The red components which may be blended with blue components of formula I above have the following structural formulae II–X:

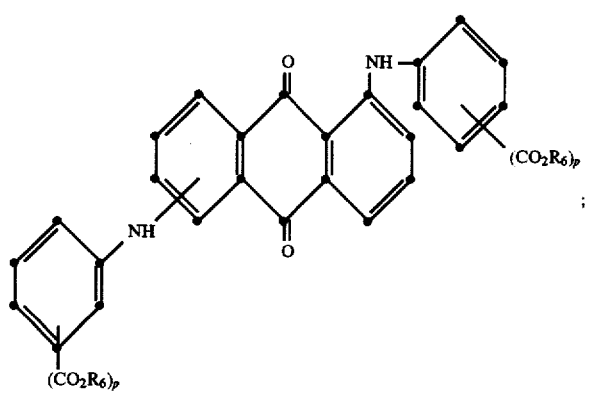

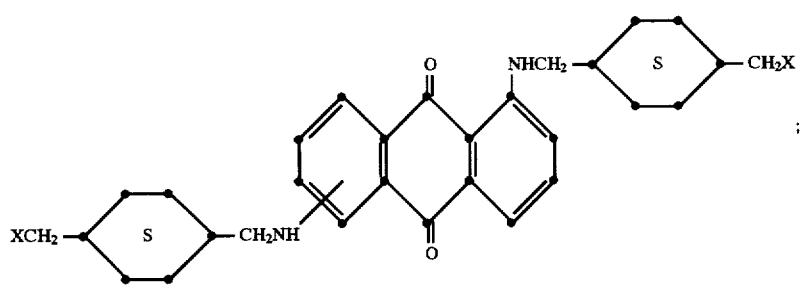
III
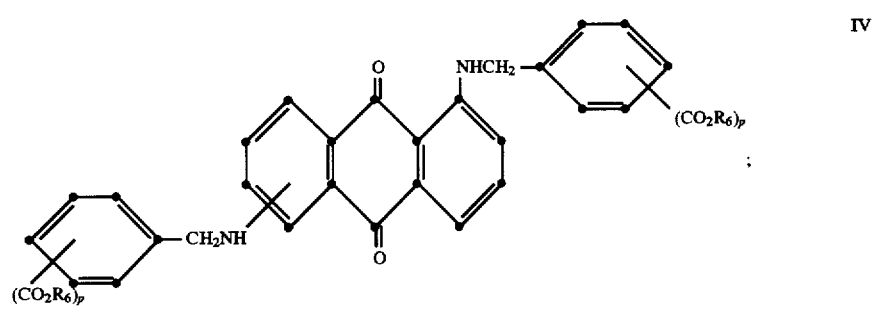
IV
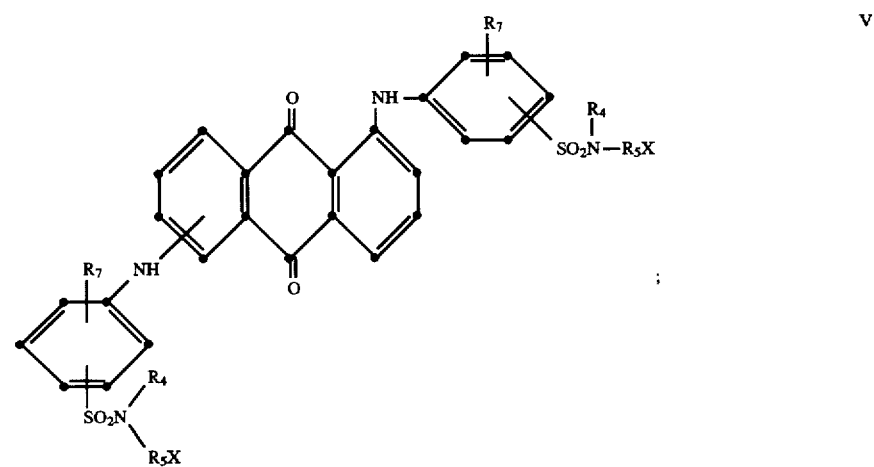
V
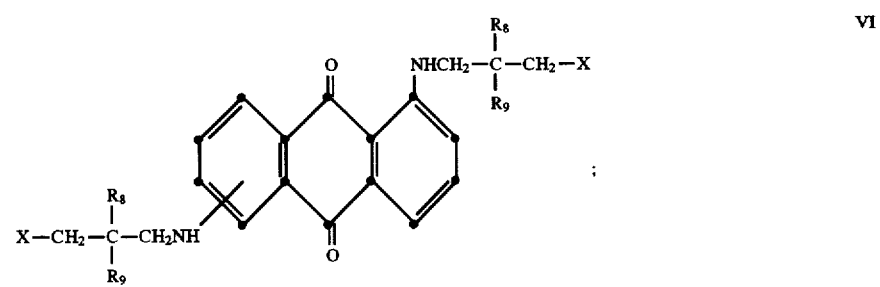
VI

VII

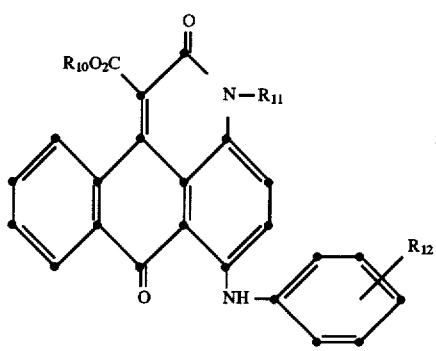

VIII

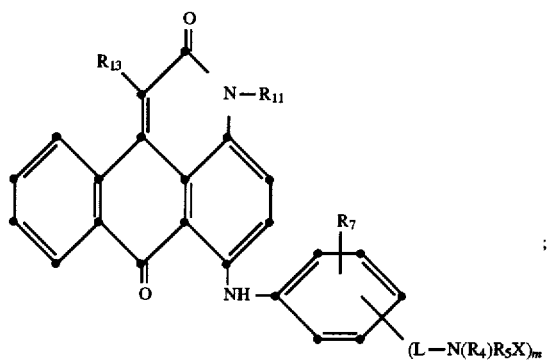

IX

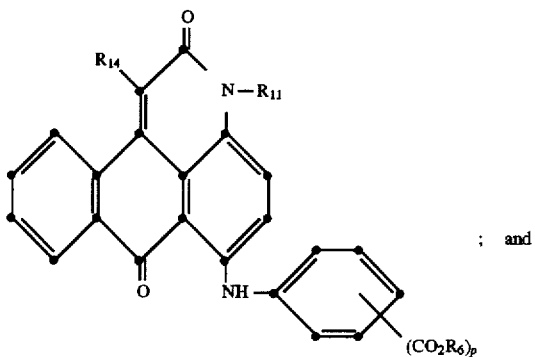

; and

X

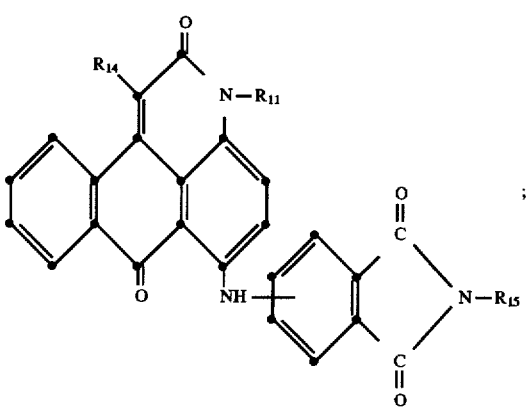

wherein:

$R_6$ is selected from the group consisting of hydrogen, $C_1-C_6$-alkyl, substituted $C_1-C_6$-alkyl, $C_3-C_7$-cycloalkyl or aryl;

$R_7$ is hydrogen or one to three groups selected from $C_1-C_6$-alkyl, substituted $C_1-C_6$ alkyl, $C_1-C_6$-alkanoylamino, halogen, hydroxy, $C_1-C_6$-alkyl $C_1-C_6$-alkoxy, $C_1-C_6$-alkylthio;

$R_8$ and $R_9$ are the same or different and are selected from the group consisting of $C_1-C_6$-alkyl, substituted $C_1-C_6$-alkyl, $C_3-C_7$-cycloalkyl or aryl;

$R_{10}$ is selected from the group consisting of $C_1-C_6$-alkyl, $C_3-C_7$-cycloalkyl or aryl;

$R_{11}$ is selected from the group consisting of hydrogen, $C_1$–$C_{12}$-alkyl, substituted $C_1$–$C_{12}$-alkyl, $C_3$–$C_7$-cycloalkyl and aryl;

$R_{12}$ is hydrogen or one to three groups selected from the group consisting of $C_1$–$C_6$-alkyl, substituted $C_1$–$C_6$-alkyl, $C_1$–$C_6$-alkoxy, substituted $C_1$–$C_6$-alkoxy, $C_1$–$C_6$-alkylthio, substituted $C_1$–$C_6$-alkylthio, halogen, hydroxy, $C_1$–$C_6$-alkanoylamino, aroylamino, $C_1$–$C_6$-alkylsulfonylamino and arylsulfonylamino;

$R_{13}$ and $R_{14}$ are selected from hydrogen, cyano or $CO_2R_{10}$;

$R_{15}$ is $R_4$ or $R_5X$ as previously defined;

L is —CO— or —SO$_2$—; X is as previously defined; m is 0 or 1; p is 1 or 2; with the provisos that $R_{13}$ is hydrogen when m is 0 and at least one polyester reactive group is present.

The term "polyester reactive group" is used herein to describe a group which is reactive with at least one of the functional groups from which the polyester is prepared under polyester forming conditions. Examples of the groups which X may represent include hydroxy, carboxy, an ester group, amino, $C_1$–$C_6$-alkylamino, etc. The ester radicals may be any radical having the formula

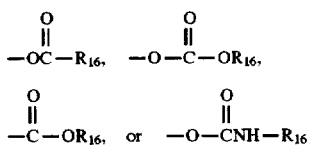

wherein $R_{16}$ is selected from the group consisting of $C_1$–$C_6$-alkyl, substituted $C_1$–$C_6$-alkyl, $C_3$–$C_7$-cycloalkyl or aryl. Reactive group X is preferably hydroxy, carboxy, $C_1$–$C_2$-alkoxycarbonyl or acetoxy.

In the terms "substituted $C_1$–$C_6$-alkyl", "substituted $C_1$–$C_{12}$-alkyl", "substituted $C_1$–$C_6$-alkoxy", "substituted $C_1$–$C_6$-akylthio", "substituted $C_1$–$C_6$-alkylsulfonyl", "$C_1$–$C_6$-alkylsulfonylamido", "substituted alkylene", "$C_1$–$C_6$-alkoxycarbonyl", the alkyl and alkylene groups or portions of the groups may contain as further substituents one or more groups, preferably one to three groups selected from the group consisting of hydroxy, halogen, cyano, aryl, aryloxy, arylthio, $C_1$–$C_4$-alkylthio, $C_1$–$C_4$-alkylthio, $C_3$–$C_7$-cycloalkyl, $C_1$–$C_4$-alkanoyloxy and —(—O—$R_{17}$—)$_p$—$R_{18}$, wherein $R_{17}$ is selected from the group consisting of $C_1$–$C_6$-alkylene, $C_1$–$C_6$-alkylenearylene, cyclohexylene, arylene, and $C_1$–$C_6$-alkylenecyclohexylene; $R_{18}$ is selected from the group consisting of hydrogen, hydroxy, carboxy, $C_1$–$C_4$-alkanoyloxy, $C_1$–$C_4$-alkoxycarbonyl, aryl, and $C_3$–$C_7$-cycloalkyl; and $_p$ is 1, 2, 3, or 4.

The term "aryl" as used herein preferably denotes phenyl and phenyl substituted with one to three substituents selected from the group consisting of $C_1$–$C_6$-alkyl, $C_1$–$C_6$-alkoxy, halogen, carboxy, cyano, $C_1$–$C_6$-alkylthio, $C_1$–$C_6$-alkylsulfonyl, trifluoromethyl, hydroxy, $C_1$–$C_6$-alkanoyloxy, $C_1$–$C_6$-alkanoylamino, and $C_1$–$C_6$-alkoxycarbonyl.

The term "arylene" includes 1,2-,1,3- and 1,4-phenylene and such radicals substituted one to three times with $C_1$–$C_6$-alkyl, $C_1$–$C_6$-alkoxy, $C_1$–$C_6$-alkoxycarbonyl, or halogen.

The terms "$C_3$–$C_8$-alkenyl" and "$C_3$–$C_8$-alkynyl" are used to denote aliphatic hydrocarbon moieties having 3–8 carbons and containing at least one carbon-carbon double bond and one carbon-carbon triple bond, respectively.

The term "halogen" is used to indicate bromine, chlorine, fluorine, and iodine.

The terms "$C_1$–$C_6$-alkanoyloxy" and "$C_1$–$C_6$-alkanoylamino" are used to represent radicals of the formula

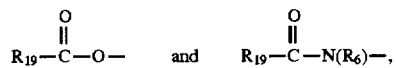

respectively, wherein $R_{19}$ is a straight or branched chain $C_1$–$C_6$-alkyl radical and $R_6$ is as defined above.

Thus, the present invention provides a polyester suitable for molding, extrusion, packaging, and fibers having copolymerized therein a blue 1,4-bis(2,6-dialkylanilino) anthraquinone compounds of Formula (I) plus a red anthraquinone or anthrapyridone compounds of formula (II)–(X) above. Preferred are blends having at least one blue 1,4-bis(2,6-dialkylanilino)anthraquinone compound of formula (I), along with a red anthraquinone or anthrapyridone compound of formulae (II)–(X) above. The composition may be a neat blend of the red and blue compounds or the composition may be pre-dissolved in one of the polyester's monomeric species, e.g., ethylene glycol.

The total amount of toner components added depends, of course, on the amount of inherent yellow color in the polyester. Generally, a maximum concentration of about 10 ppm of combined toner components and a minimum concentration of about 0.5 ppm are required with about 1–7 ppm of blue component (I) in combination with about 0.5–3 ppm of red components of formulae (II–X) being preferred.

In a preferred embodiment of the present invention, the blue anthraquinone compound corresponds to structure (I) above, wherein R is hydrogen; $R_1$ and $R_2$ are independently selected from methyl and ethyl; $R_3$ is hydrogen, methyl, or bromo; $R_4$ is hydrogen, $C_1$–$C_4$-alkyl or aryl; $R_5$ is selected from the group consisting of $C_1$–$C_6$-alkylene, $C_1$–$C_4$-alkylene-O—$C_1$–$C_4$-alkylene, —CH$_2$C$_6$H$_{10}$CH$_2$—, arylene, or —CH$_2$-arylene- and the red component corresponds to formula (V), wherein $R_7$ is C–$C_6$-alkoxy and $R_4$ and $R_5$ are as defined above for the preferred blue component (I).

In an especially preferred embodiment of the present invention, the blue compound of formula (I) is

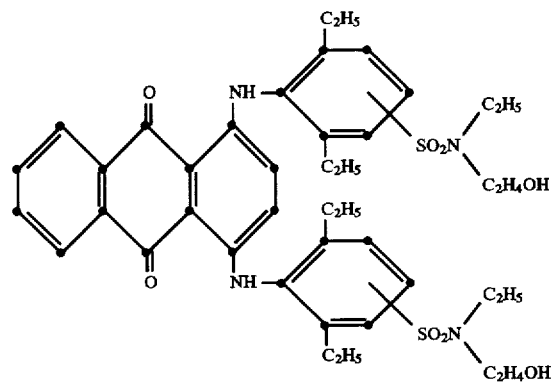

and the red compound of formula (V) is

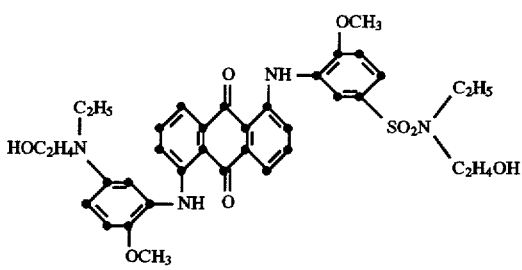

The blue anthraquinones of formula (I) can be prepared in general by reaction of leuco quinizarin(1,4,9,10-tetrahydroxyanthracene) compounds with an excess aromatic amines, preferably in the presence of acid catalysts such as boric acid as described in U.S. Pat. No. 3,918,976, incorporated herein by reference and as follows:

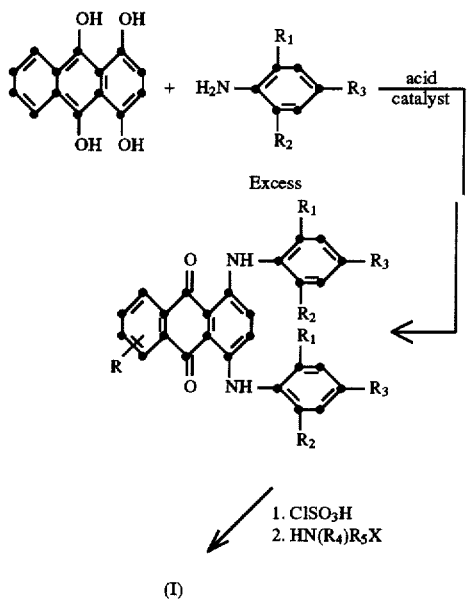

The 1,4-bis(2,6-dialkylanilino)anthraquinone compounds thus produced are readily functionalized if needed by first chlorosulfonating with chlorosulfonic acid to produce di-sulfonyl chlorides which can be reacted with amines containing polyester reactive groups, the general method being disclosed in U.S. Pat. No. 2,731,476, incorporated herein by reference.

Typical amines corresponding to formula $HN(R_4)R_5X$ include 2-aminoethanol, 2,2-iminodiethanol, 1-amino-2,3-propandiol, 2-methylaminoethanol, 2-ethylaminoethanol, 2-anilinoethanol, methyl anthranilate, methyl m-amino benzoate, p-aminobenzoic acid, m-aminophenol, 6-aminohexanoic acid, β-alanine, glycine ethyl ester, 2-(p-aminophenyl)ethanol, 2-(p-aminophenoxy)ethanol 4-aminomethylcyclohexanemethanol and 3-amino-2,2-dimethyl-1-propanol.

Red compounds (II) can be prepared by reacting 1,5-dichloroanthraquinone and/or 1,8-dichloroanthraquinone or mixtures thereof with o, m- and p-aminobenzoic acids (and esters thereof) by a modified Ullmann reaction involving nitrogen arylation of the anilines in the presence of copper catalysts (see U.S. Pat. No. 4,359,580, incorporated herein by reference).

Red compounds of formula (III) can be prepared as described in U.S. Pat. No. 4,420,581 and compounds of formula (VI) can be prepared as in U.S. Pat. No. 4,999,418, incorporated herein by reference.

Red anthraquinone compounds of formula (IV) can be prepared by reacting 1,5-dichloroanthraquinone and 1,8-dichloroanthraquinone or mixtures thereof with substituted benzyl amines by procedures similar to those used in preparing compounds of formulae (III) and (VI).

Red anthrapyridone compounds (VII) can be prepared as disclosed in U.S. Pat. No. 4,790,581 incorporated herein by reference; procedures useful in preparing red-violet anthrapyridone compounds (VIII) and (IX) are disclosed in U.S. Pat. No. 4,745,174, incorporated herein by reference.

The organic dyes useful in the polyester compositions of the present invention can be added before or during polymerization.

The antimony compounds utilized in the present invention can be generally any trivalent organic antimony compound known to the art. The antimony compounds useful in the present invention do not include compounds further reacted with α-hydroxycarboxylic acid or derivatives thereof and/or α,β-dicarboxylic acid or derivatives thereof.

Examples of antimony compounds useful in the context of the invention include, but are not limited to the following: tributyl antimony oxide, $KSb(OH)_6$, $NH_4SbF_6$ and $SBS_3$, antimonate esters of inorganic acids, cyclic alkyl antimonate esters and aryl antimonic acid compounds such as potassium antimony, antimony oxide, antimony trioxide, antimony alkoxide, such as antimony isopropoxide, antimony halide, such as antimony chloride, antimony bromide, and antimony fluoride, antimony sulfide, sodium or potassium antimonate, antimony carboxylate such as antimony acetate, antimony glycolate and the like.

Examples of preferred antimony compounds are: antimony carboxylate, especially antimony triacetate, antimony oxide, antimony trioxide, antimony glycolate (either formed separately or during polymerization), and the like. The antimony compound desirably is added to the condensation stage or step of the polymerization.

Examples of α-hydroxycarboxylic acids which are reacted with antimony compounds to form products which are not included within the scope of the invention are ones containing 2 to 30 carbon atoms.

For example, glycolic acid, lactic acid, α-hydroxystearic acid and α-hydroxyisobutyric acid. But, those which have either a total of at least three hydroxyl and carboxyl groups or at least one aromatic ring in the α-position in relation to the carboxyl group, are particularly preferred in the present invention. Preferable α-hydroxycarboxylic acids include, for example, malic acid, α-methylmalic acid, citric acid, tartaric acid, α-methyltartaric acid, α-hydroxy-α'-methylsuccinic acid, α-hydroxyglutaric acid, glyceric acid, α,β-dihydroxyisobutyric acid, dihydroxyfumaric acid, gluconic acid, tartronic acid, benzilic acid, α-phenyllactic acid and mixtures thereof.

Examples of α,β-dicarboxylic acids which are reacted with antimony compounds to form products which are not included within the scope of the invention are those having 4 to 30 carbon atoms which are selected from the compounds represented by the following formulae and their functional derivatives.

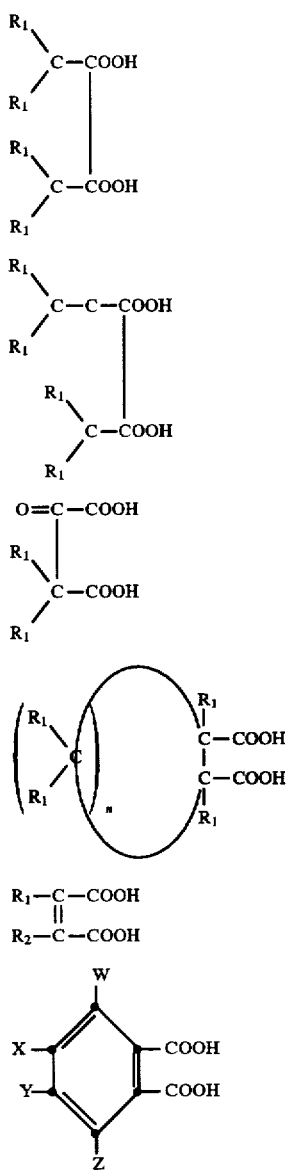

wherein $R_1$, $R_2$, $R_3$, and $R_4$ are identical with or different from each other and selected from a hydrogen atom and unsubstituted or substituted alkyl, cycloalkyl, aryl, aralkyl, allyl and alkoxyl groups, said substituted groups having a substituent selected from carbonyl group, halogen and carboxyl groups; W, X, Y and Z are identical with or different from each other and selected from a hydrogen atom and alkyl, hydroxyl and carboxyl groups; and n is an integer of at least 1.

Such α,β-dicarboxylic acids include, for example, maleic acid, dimethylmaleic acid, phenylmaleic acid, fumaric acid, succinic acid, methylsuccinic acid, 2-methyl-3-ethylsuccinic acid, tetramethylsuccinic acid, tetramethylsuccinic acid, phenylsuccinic acid, cyclohexylsuccinic acid, ethoxysuccinic acid, itaconic acid, cyclopropane-1,2-dicarboxylic acid, 1-phenylcyclopropane-2,3-dicarboxylic acid, cyclobutane-1,2-dicarboxylic acid, 1,2-dimethylcyclobutane-3,4,dicarboxylic acid, cyclopentane-1, 2-dicarboxylic acid, cyclohexane-1,2-dicarboxylic acid, oxalacetic acid, phthalic acid, 3-methylphthalic acid, 4,5-dimethylphthalic acid, 4-hydrophthalic acid, trimellitic acid, 1-butene-2,3,4-tricarboxylic acid, pyromellitic acid and mixtures thereof.

The preferred organic toner dyes are selected from the classes of anthraquinones and anthrapyridones which are thermally stable at the reactor temperatures used to produce the polyesters. This invention is not limited to the dyes specifically described in these patents, however. The levels of dyes present in the invention may vary depending on the extinction coefficient of the particular compound as well as the amount of color generated under the polymerization conditions.

The polyester compositions of the invention may contain other additives such as branching agents and chain extension agents, free radical stabilizers such as hindered phenols, flame retardants, tougheners, epoxy compounds, mold release agents, nucleating agents, and other colorants which may also be desirable in such formulations.

Such additives are generally present at 0.1 to about 20 weight % based on the total weight of said polyester composition.

Useful flame retardants, include, but are not limited to, brominated polystyrene combined with sodium antimonate.

Examples of reinforcing agents used in combination with the polyesters of its invention include are glass fibers, carbon fibers, mica, clay, talc, wollastonite, and calcium carbonate. A particularly preferred reinforcing agent is glass fiber. It is preferable that the glass fibers be present in the polyester composition at from 0.1 to 40%, preferably 0.1 to 30%, by weight based on the total weight of said polyester composition.

Glass fibers suitable for use in compositions containing the polyesters of the invention may be in the form of glass filaments, threads, fibers, or whiskers, etc., and may vary in length from about ⅛ inch to about 2 inches. Chopped glass strands having a length of about ⅛ inch to about ¼ inch are preferred. Such glass fibers are well known in the art. Of course, the size of these glass fibers may be greatly diminished depending on the blending means employed, even to lengths of 300 to 700 microns or lower.

The polyester compositions of the invention may be reinforced with a mixture of glass and other reinforcing agents as described above, such as mica or talc, and/or with other additives.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise indicated.

EXAMPLES

The poly(ethylene terephthalate) and poly(ethylene terephthalate-co-1,4-cyclohexanedimethylene terephthalate) polyesters described in Tables 1 and 2 were prepared by standard melt polymerization techniques known to the art. Terephthalic acid, ethylene glycol and 1,4-cyclohexanedimethanol (CHDM) were first pre-esterified to form the bis(2-hydroxyethyl)terephthalate or the equivalent CHDM co-terephthalate monomers in a pressurized vessel. This was required due to the high temperature necessary to dissolve terephthalic acid in the polyhydric alcohols. However, this should not be limited to such a procedure, as a continuous process, or any other polyester synthesis based on TPA (terephthalic acid) known the art, could also be used. Once formed, the monomers were added to a 4-necked 500 mL round bottom glass flask which was equipped with a nitrogen inlet, an additive inlet, a condensate outlet and a stirrer. Catalysts, stabilizers and toner dyes, as indicated in Table 1, were also added to this same reaction vessel. The reaction flask was then purged with nitrogen and then immersed in a metal bath which was preheated to 225° C. The mixture was stirred and held at this temperature for 15 minutes to form a homogeneous melt. The temperature was then raised to 280° C. and vacuum was applied incrementally until a vacuum of <1 mm Hg was obtained. The reaction mixture was stirred and maintained under these conditions for 45 minutes. The formed polyester was then isolated, and analyzed for color, molecular weight, and thermal stability.

Inherent viscosity was measured to evaluate molecular weight and was determined at 25° C. using 0.5 gram of polymer per 100 mL of a solvent composed of 60 wt % phenol and 40 wt % tetrachloroethane.

The color values L*, a* and b* were determined using a Hunter Lab Ultrascan Spectra Colorimeter manufactured by Hunter Associates Lab Inc., Reston, Va. The colors determinations were taken at random locations on the sample and averaged. They were determined by the L*a*b* color system of the CIE (International Commission on Illumination) (translated).

The thermal stability is assessed by an evaluation of the degradation rate constant ($K_d$) as evaluated by monitoring the melt viscosity in air at 285° C. for polyethylene terephthalate and 270° C. for the copolyester used in a capillary rheometer by the method described by J. Devaux et al in Makromol. Chem. 179, 2201, 2209 (1978). With this convention, the smaller the $K_d$, the more thermally stable the material is. Calculations are conventional as known by those skilled in the art.

By "thermally stable" , it is meant that the $K_d$ is lower for the polyesters of this invention when compared to polyesters of the same composition prepared by most known catalyst systems where stabilizers are not employed. $K_d$ is defined by the equation:

$$\frac{1}{\eta^a} = \frac{1}{\eta_o^a} + K_d t$$

$\eta$=Melt viscosity at time t (dynes·sec)

$\eta_o$=Melt viscosity at time t=0 (dynes·sec)

a=Constant [0.294]

$K_d$=Thermal degradation constant t=time in minutes

It is preferred that the sample be dry for this analysis. $K_d$ is determined from the slope of the line obtained by plotting $1/\eta^a$ vs. time and should be linear. This value of $K_d$ is also dependant on the temperature at which it is measured. For example, a thermally stable poly(ethylene terephthalate) preferably has a $K_d$ measured at 285° C. in an air environment of less than 0.001. Units of $K_d$ are as follows:

$$\frac{1}{[dyne \cdot sec]^{0.294} \cdot min}$$

Example 1 shows poly(ethylene terephthalate) polymerized utilizing an antimony catalyst in the absence of a phosphorus stabilizer. Examples 2–4 also show poly (ethylene terephthalate) synthesized with an antimony catalyst, however a phosphorus stabilizer was included at increasing levels. From Table 2, it can be seen that the addition of the phosphorus stabilizer does not decrease the color, and in addition the phosphorus stabilizer actually increased the degradation rate constant indicating a less thermally stable material.

Example 5 shows a poly(69 mole % ethylene terephthalate-co-31 mole % 1,4-cyclohexanedimethylene terephthalate) polymerized using a conventional catalyst system of titanium with a cobalt bluing agent and a phosphorus stabilizer. From Table 2 it can be seen that this polyester has high I.V. and reasonable color. However, Example 5 has a relatively high thermal degradation rate constant ($K_d$) of $2.12 \times 10^{-4}$ as measured at 270° C., even though a phosphorus stabilizer was used. In contrast, Example 6 utilizes only antimony acetate as a catalyst, has slightly lower I.V., but good color and a low degradation rate constant of $1.10 \times 10^{-4}$ as measured at 270° C., despite the fact that no stabilizer was utilized. Example 7 shows the essentially the same polymer as 6, but with toner dyes added to improve the color as indicated by both the a* and b* values reported in Table 2. Example 8 is also essentially identical to 6, but this time a phosphorus stabilizer was added. As seen from the results in Table 2, Example 8 has essentially identical properties as 6 indicating that the phosphorus stabilizer is not needed.

These results show conclusively that when antimony acetate is used as a catalyst the phosphorus stabilizer is not necessary to provide thermal stability or low color. Furthermore if antimony acetate is utilized as a catalyst in conjunction with a nonreactive organic bluing agent a thermally stable polyester with excellent color is achievable.

TABLE 1

| Example | % TPA | % EG | % CHDM | Catalyst, Additives* |
|---------|-------|------|--------|----------------------|
| 1 | 100 | 100 | 0 | 225 Sb |
| 2 | 100 | 100 | 0 | 225 Sb, 2.8 P |
| 3 | 100 | 100 | 0 | 225 Sb, 7.9 P |
| 4 | 100 | 100 | 0 | 225 Sb, 64 P |
| 5 | 100 | 69 | 31 | 45 Ti, 60 Co & 30 P |
| 6 | 100 | 69 | 31 | 200 Sb |
| 7 | 100 | 69 | 31 | 200 Sb, 3 RT & 0.75 BT |
| 8 | 100 | 69 | 31 | 200 Sb, 15 P |

*Concentrations are in parts per million (ppm)

P = Phosphorus added as Merpol A which is commercially available from DuPont

Ti = Titanium added as Titanium isopropoxide

Co = Cobalt added as Cobalt Acetate

Sb = Antimony added as Antimony acetate

TPA = terephthalic acid

RT = Red Dye having the following structure:

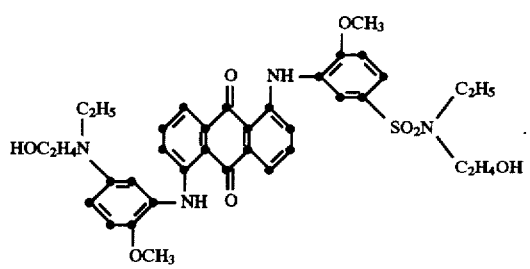

BT=Blue Dye having the following structure:

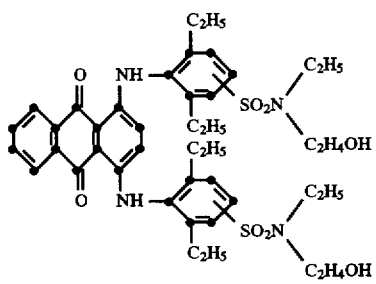

TABLE 2

| Example | I.V. | L* | a* | b* | $K_d \times 10^4$ |
|---|---|---|---|---|---|
| 1 | 0.74 | 84.55 | −1.28 | 2.64 | 4.51 |
| 2 | 0.73 | 84.93 | −1.02 | 2.34 | 5.99 |
| 3 | 0.73 | 86.42 | −1.37 | 2.66 | 6.38 |
| 4 | 0.73 | 86.86 | −1.35 | 2.74 | 9.18 |
| 5 | 0.73 | 90.2 | −1.46 | 2.10 | 2.12 |
| 6 | 0.70 | 85.1 | −0.9 | 6.72 | 1.10 |
| 7 | 0.61 | 82.2 | −0.09 | 1.38 | 0.96 |
| 8 | 0.62 | 82.2 | −0.03 | 4.42 | 1.60 |

The invention has been described in detail with particular reference to preferred embodiments thereof, but it will be understood that variations and modifications can be effected within the spirit and scope of the invention. Moreover, all patents, patent applications (published and unpublished, foreign or domestic), literature references or other publications noted above are incorporated herein by reference for any disclosure pertinent to the practice of this invention.

We claim:

1. A thermally stable polyester, comprising:

a) a polyester resin prepared by adding a dicarboxylic acid to a glycol compound, said dicarboxylic acid selected from the group consisting of aliphatic dicarboxylic acids having a total of from 3 to 16 carbon atoms, alicyclic dicarboxylic acids having 7 to 12 carbon atoms, aromatic dicarboxylic acids containing a total of from 8 to 16 carbon atoms, and combinations thereof, and wherein said glycol is selected from the group consisting of glycols having from 2 to 12 carbon atoms, glycol ethers having from 4 to 12 carbon atoms, and combinations thereof, the polyester resin having been prepared in the presence of a catalyst system consisting essentially of one or more antimony compounds which is not reacted with α-hydroxy carboxylic acids, α,β-dicarboxylic acids or derivatives thereof, and b) an organic dye.

2. The polyester of claim 1 wherein said organic dye is an anthraquinone dye comprising at least one blue 1,4-bis(2,6-dialkylanilino)anthraquinone compound of Formula (I)

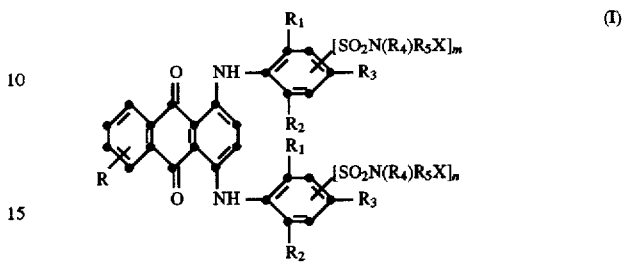

wherein:

R is selected from the group consisting of hydrogen, $C_1$–$C_6$ alkyl, halogen, carboxy, and

$R_1$ and $R_2$ are independently $C_1$–$C_6$-alkyl;

$R_3$ is selected from the group consisting of hydrogen, halogen, $C_1$–$C_6$-alkyl, substituted $C_1$–$C_6$ alkyl, hydroxy, $C_1$–$C_6$-alkoxy, substituted $C_1$–$C_6$-alkoxy, cyano, thiocyano, $C_1$–$C_6$-alkylthio, substituted $C_1$–$C_6$-alkylthio, $C_1$–$C_6$-alkylsulfonyl, substituted $C_1$–$C_6$-alkylsulfonyl, $C_1$–$C_6$-alkoxycarbonyl, carboxy, aryloxy, arylthio, arylsulfonyl, and $SO_2N(R_4)R_5X$ when m and/or n are zero;

$R_4$ is selected from the group consisting of hydrogen, $C_1$–$C_6$-alkyl, substituted $C_1$–$C_6$-alkyl, $C_3$–$C_8$-alkenyl, $C_3$–$C_8$-alkynyl, $C_3$–$C_7$-cycloalkyl and aryl;

$R_5$ is a linking group selected from the group consisting of $C_1$–$C_8$-alkylene, $C_1$–$C_6$-alkylene-Z—$C_1$–$C_6$-alkylene, arylene-$C_1$–$C_6$-alkylene, arylene-Z—$C_1$–$C_6$ alkylene, $C_3$–$C_7$-cycloalkylene, $C_1$–$C_6$-alkylene-cycloalkylene-$C_1$–$C_6$-alkylene, $C_1$–$C_6$-alkylene-arylene-$C_1$–$C_6$-alkylene, and $C_1$–$C_6$-alkylene-Z-arylene-Z—$C_1$–$C_6$-alkylene, wherein Z is selected from —O—, —S— or $SO_2$;

X is hydrogen or a polyester reactive group; and m and n are independently 0 or 1; with the proviso that at least one polyester reactive group is present;

along with at least one red anthraquinone or anthrapyridone compound selected from formula (II)–(X) below:

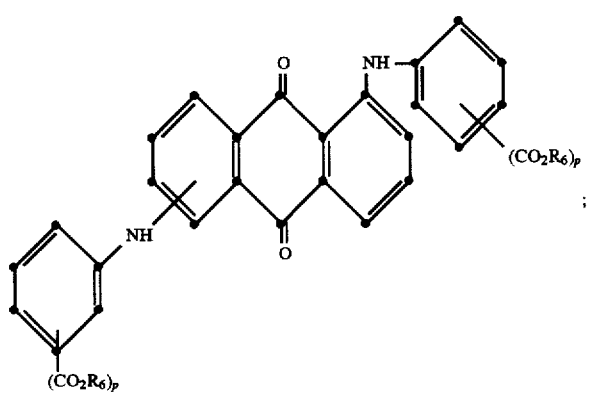

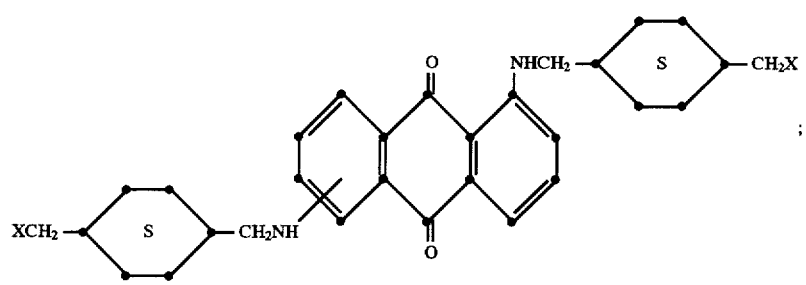
III
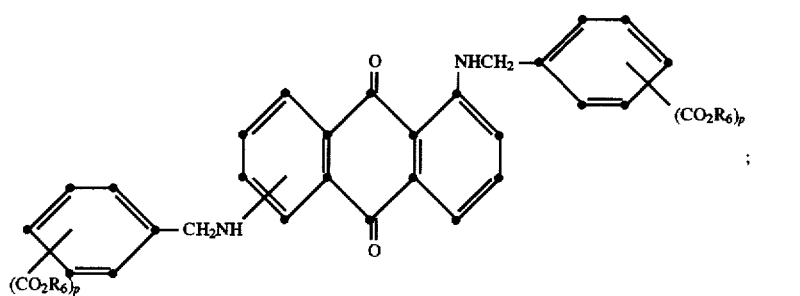
IV
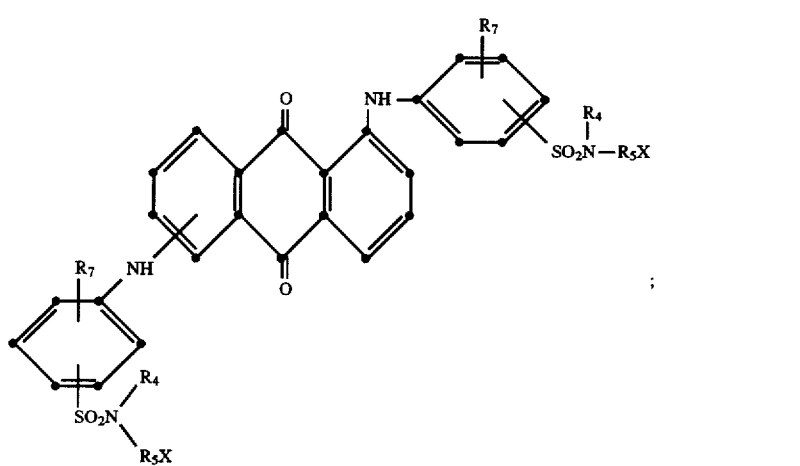
V
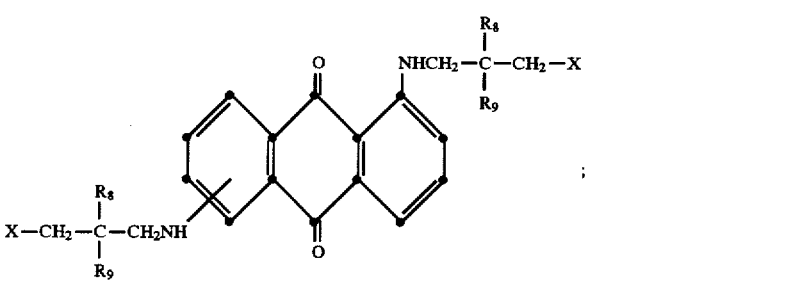
VI
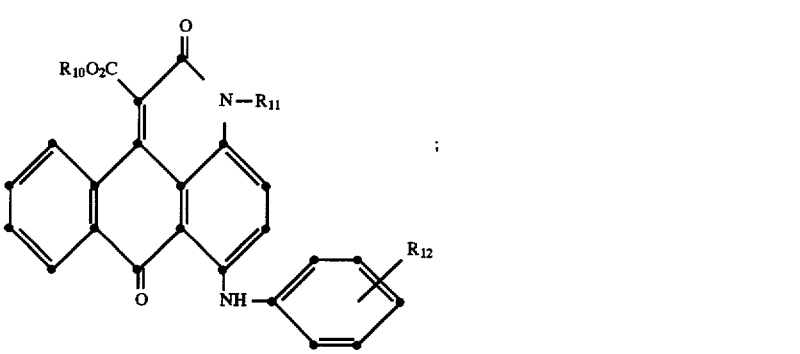
VII

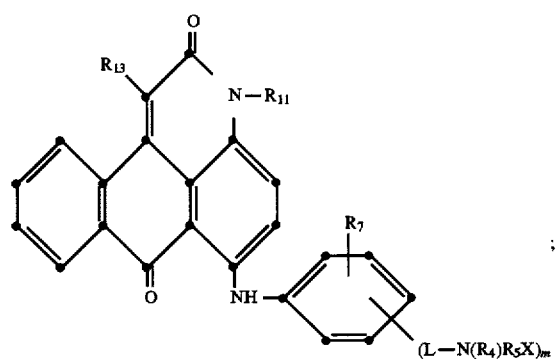

;

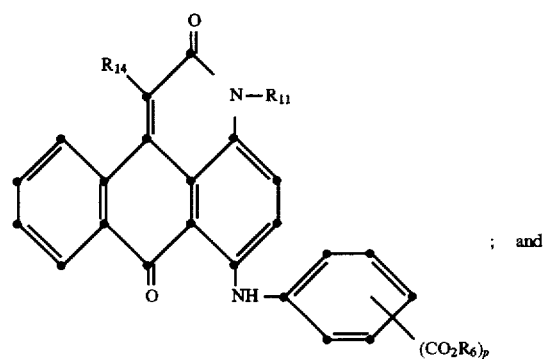

; and

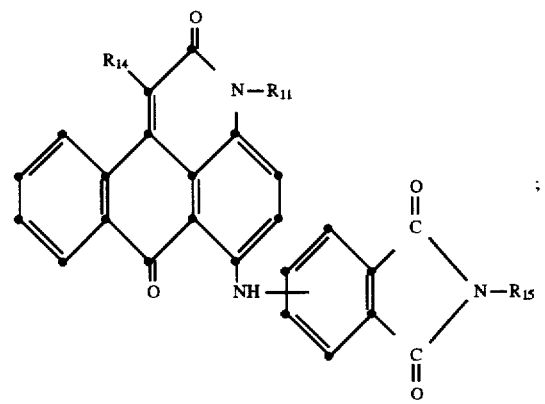

;

wherein:

R₆ is selected from the group consisting of hydrogen, C₁–C₆-alkyl, substituted C₁–C₆-alkyl, C₃–C₇-cycloalkyl and aryl;

R₇ is hydrogen or one to three groups selected from C₁–C₆-alkyl, C₁–C₆-substituted alkyl, C₁–C₆-alkanoylamino, halogen, C₁–C₆-alkyl C₁–C₆-alkoxy, and C₁–C₆-alkylthio;

R₈ and R₉ are the same or different and are selected from the group consisting of C₁–C₆-alkyl, substituted C₁–C₆-alkyl, C₃–C₇-cycloalkyl and aryl;

R₁₀ is selected from the group consisting of C₁–C₆-alkyl, C₃–C₇-cycloalkyl and aryl;

R₁₁ is selected from the group consisting of hydrogen, C₁–C₁₂-alkyl, substituted C₁–C₁₂-alkyl, C₃–C₇-cycloalkyl and aryl;

R₁₂ is hydrogen or one to three groups selected from the group consisting of C₁–C₆-alkyl, substituted C₁–C₆-alkyl, C₁–C₆-alkoxy, substituted C₁–C₆-alkoxy, C₁–C₆-alkylthio, substituted C₁–C₆-alkylthio, halogen, hydroxy, C₁–C₆-alkanoylamino, aroylamino, C₁–C₆-alkylsulfonylamino and arylsulfonylamino;

R₁₃ and R₁₄ are selected from hydrogen, cyano or CO₂R₁₀;

R₁₅ is R₄ or R₅X as previously defined;

L is —CO— or —SO₂—; X is hydrogen or a polyester reactive group; m is 0 or 1; and p is 1 or 2; with the provisos that R₁₃ is hydrogen when m is 0 and at least one polyester reactive group is present.

3. The polyester of claim 2, wherein the blue anthraquinone compound(s) corresponds to structure (I) above, wherein R is hydrogen; R₁, and R₂ are independently selected from methyl and ethyl; R₃ is hydrogen, methyl, or bromo; R₄ is hydrogen, C₁–C₄-alkyl or aryl; R₅ is selected from the group consisting of C₁–C₆-alkylene, C₁–C₄-alkylene-O—C₁–C₄-alkylene, —CH₂C₆H₁₀CH₂—, arylene, and —CH₂-arylene- and the red component corresponds to formula (V), wherein R₇ is C₁–C₆-alkoxy.

4. The polyester of claim 2, wherein the concentration of blue and red compounds taken together is from about 0.5 ppm to about 10 ppm.

5. The polyester of claim 2, wherein the total concentration of blue compound(s) is about 1 to 7 ppm and the concentration of red compound(s) is about 0.5 to 3 ppm.

6. The polyester of claim 2, wherein the compound of formula (I) is

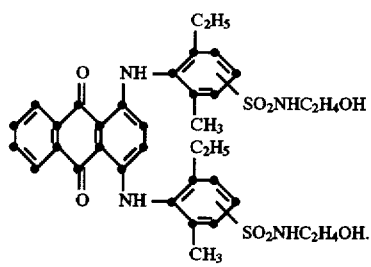

7. The polyester of claim 2, wherein the compound of formula (I) is

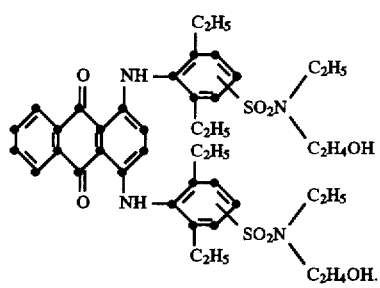

8. The polyester of claim 2, wherein the red compound of formula (V) is

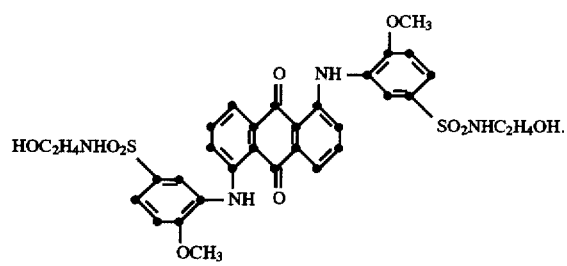

9. The polyester of claim 2, wherein the red compound of formula (V) is

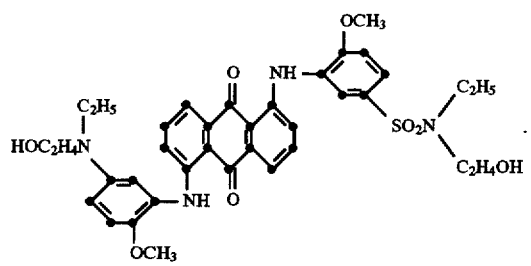

10. The polyester of claim 2, wherein the blue compound of formula (I) is

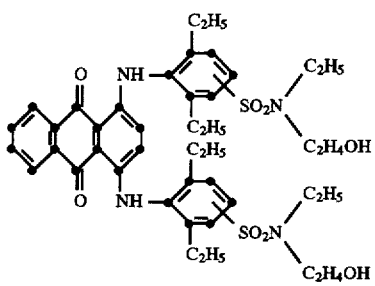

and wherein the red compound of formula (V) is

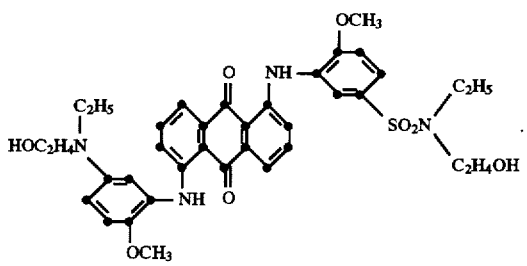

11. The polyester of claim 2, wherein the red compound of formula (II) is

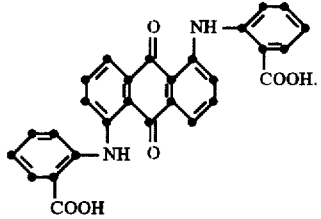

12. The polyester of claim 2, wherein the red compound of formula (III) is

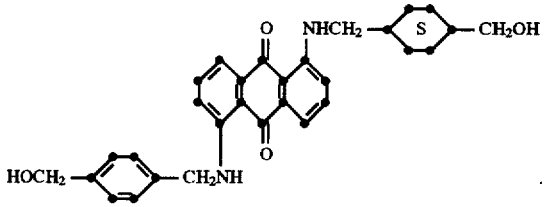

13. The polyester of claim 2, wherein the red compound of formula (VI) is

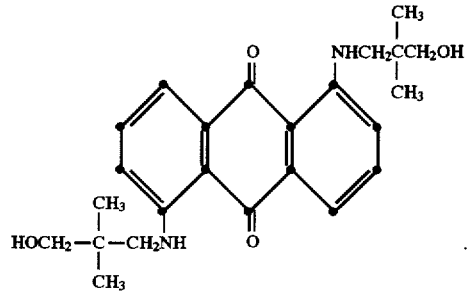

14. The polyester of claim 2, wherein the red compound of formula (VIII) is

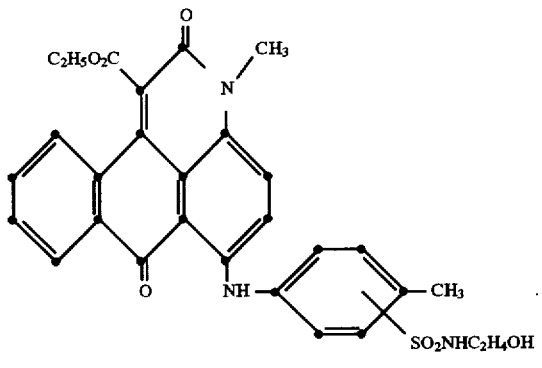

15. A process for producing a thermally stable polyester resin wherein said polyester resin is prepared by adding a dicarboxylic acid to a glycol compound, said dicarboxylic acid being selected from the group consisting of aliphatic dicarboxylic acids having a total of from 3 to 16 carbon atoms, alicyclic dicarboxylic acids having 7 to 12 carbon atoms, aromatic dicarboxylic acids containing a total of from 8 to 16 carbon atoms, and combinations thereof, said glycol being selected from the group consisting of glycols having from 2 to 12 carbon atoms, glycol ethers having from 4 to 12 carbon atoms, and combinations thereof, said polyester resin being prepared in the presence of a catalyst system consisting essentially of one or more antimony compounds which is not reacted with α-hydroxycarboxylic acids, α,β-dicarboxylic acids or derivatives thereof, and said polyester resin being prepared in the presence of an organic dye.

16. The process of claim 15 wherein said organic dye is an anthraquinone dye comprising at least one blue 1,4-bis (2,6-dialkylanilino)anthraquinone compound of Formula (I)

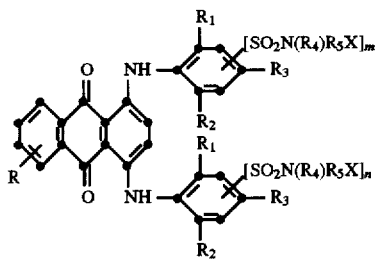

(I)

wherein:

R is selected from the group consisting of hydrogen, $C_1$–$C_6$ alkyl, halogen, carboxy, and

$R_1$ and $R_2$ are independently $C_1$–$C_6$-alkyl;

$R_3$ is selected from the group consisting of hydrogen, halogen, $C_1$–$C_6$-alkyl, substituted $C_1$–$C_6$ alkyl, hydroxy, $C_1$–$C_6$-alkoxy, substituted $C_1$–$C_6$-alkoxy, cyano, thiocyano, $C_1$–$C_6$-alkylthio, substituted $C_1$–$C_6$-alkylthio, $C_1$–$C_6$-alkylsulfonyl, substituted $C_1$–$C_6$-alkylsulfonyl, $C_1$–$C_6$-alkoxycarbonyl, carboxy, aryloxy, arylthio, arylsulfonyl, and $SO_2N(R_4)R_5X$ when m and/or n are zero;

$R_4$ is selected from the group consisting of hydrogen, $C_1$–$C_6$-alkyl, substituted $C_1$–$C_6$-alkyl, $C_3$–$C_8$-alkenyl, $C_3$–$C_8$-alkynyl, $C_3$–$C_7$-cycloalkyl and aryl;

$R_5$ is a linking group selected from the group consisting of $C_1$–$C_8$-alkylene, $C_1$–$C_6$-alkylene-Z—$C_1$–$C_6$-alkylene, arylene-$C_1$–$C_6$-alkylene, arylene-Z—$C_1$–$C_6$ alkylene, $C_3$–$C_7$-cycloalkylene, $C_1$–$C_6$-alkylene-cycloalkylene-$C_1$–$C_6$-alkylene, $C_1$–$C_6$-alkylene-arylene-$C_1$–$C_6$-alkylene, and $C_1$–$C_6$-alkylene-Z-arylene-Z—$C_1$–$C_6$-alkylene, wherein Z is selected from —O—, —S— or $SO_2$;

X is hydrogen or a polyester reactive group; and m and n are independently 0 or 1; with the proviso that at least one polyester reactive group is present;

along with at least one red anthraquinone or anthrapyridone compound selected from formula (II)–(X) below:

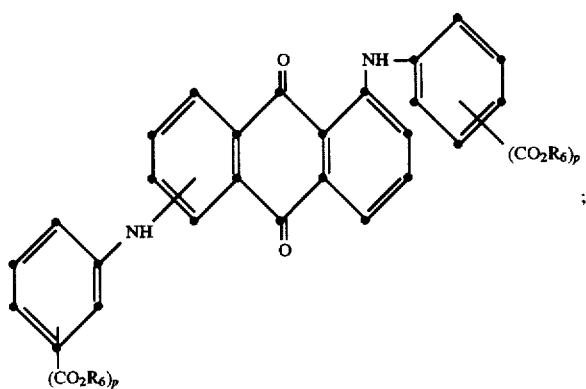

II

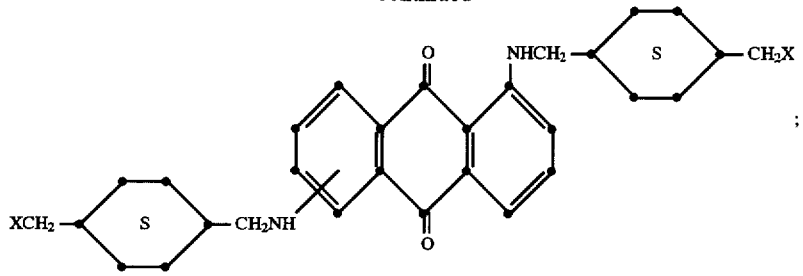
III
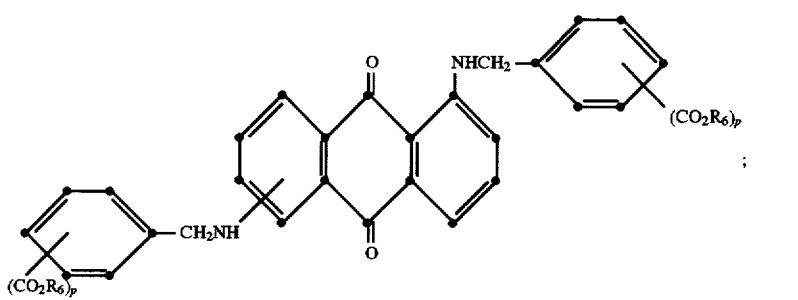
IV
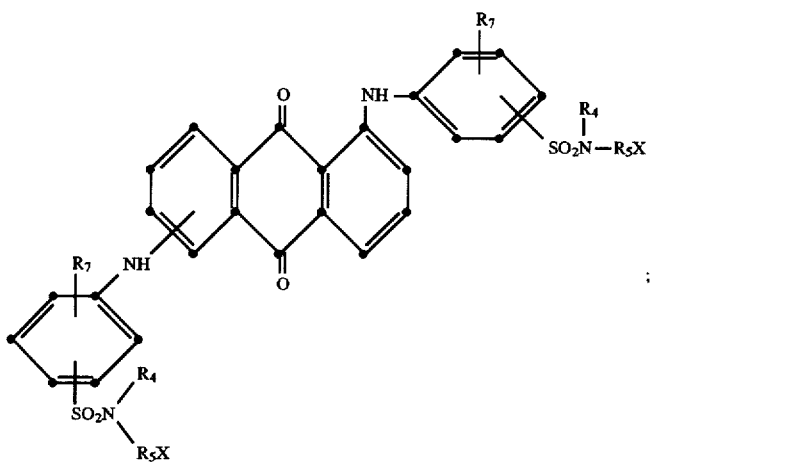
V
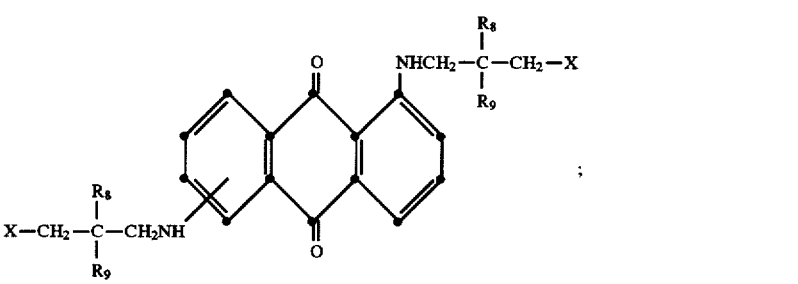
VI
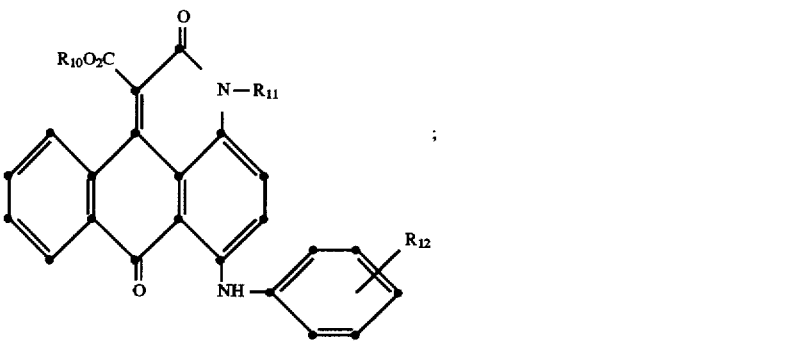
VII

VIII

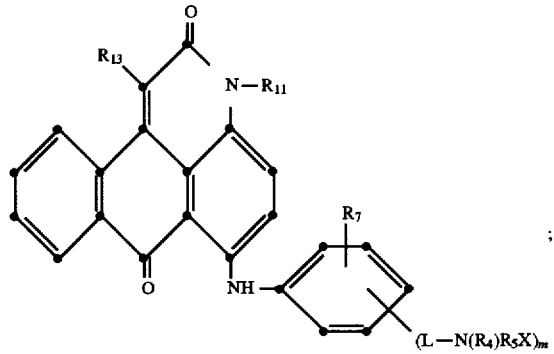

IX

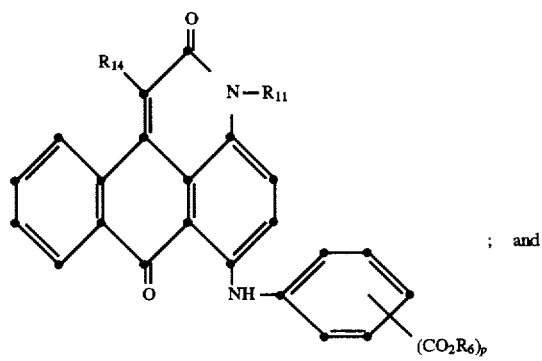
; and

X

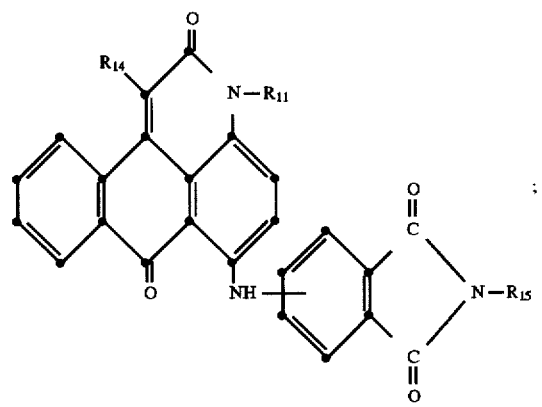
;

wherein:

$R_6$ is selected from the group consisting of hydrogen, $C_1$–$C_6$-alkyl, substituted $C_1$–$C_6$-alkyl, $C_3$–$C_7$-cycloalkyl and aryl;

$R_7$ is hydrogen or one to three groups selected from $C_1$–$C_6$-alkyl, $C_1$–$C_6$-substituted alkyl, $C_1$–$C_6$-alkanoylamino, halogen, $C_1$–$C_6$-alkyl, $C_1$–$C_6$-alkoxy, and $C_1$–$C_6$-alkylthio;

$R_8$ and $R_9$ are the same or different and are selected from the group consisting of $C_1$–$C_6$-alkyl, substituted $C_1$–$C_6$-alkyl, $C_3$–$C_7$-cycloalkyl and aryl;

$R_{10}$ is selected from the group consisting of $C_1$–$C_6$-alkyl, $C_3$–$C_7$-cycloalkyl or aryl;

$R_{11}$ is selected from the group consisting of hydrogen, $C_1$–$C_{12}$-alkyl, substituted $C_1$–$C_{12}$-alkyl, $C_3$–$C_7$-cycloalkyl and aryl;

$R_{12}$ is hydrogen or one to three groups selected from the group consisting of $C_1$–$C_6$-alkyl, substituted $C_1$–$C_6$-alkyl, $C_1$–$C_6$-alkoxy, substituted $C_1$–$C_6$-alkoxy, $C_1$–$C_6$-alkylthio, substituted $C_1$–$C_6$-alkylthio, halogen, hydroxy, $C_1$–$C_6$-alkanoylamino, aroylamino, $C_1$–$C_6$-alkylsulfonylamino and arylsulfonylamino;

$R_{13}$ and $R_{14}$ are selected from hydrogen, cyano or $CO_2R_{10}$;

$R_{15}$ is $R_4$ or $R_5X$ as previously defined;

L is —CO— or —SO$_2$—; X is as previously defined; m is 0 or 1; and p is 1 or 2; with the provisos that $R_{13}$ is hydrogen when m is 0 and at least one polyester reactive group is present.

17. The process of claim 16, wherein the blue anthraquinone compound(s) corresponds to structure (I) above, wherein R is hydrogen; $R_1$ and $R_2$ are independently selected from methyl and ethyl; $R_3$ is hydrogen, methyl, or bromo; $R_4$ is hydrogen, $C_1$–$C_4$-alkyl or aryl; $R_5$ is selected from the group consisting of $C_1$–$C_6$-alkylene, $C_1$–$C_4$-alkylene-O—$C_1$–$C_4$-alkylene, —CH$_2$C$_6$H$_{10}$CH$_2$—, arylene, and —CH$_2$-arylene- and the red component corresponds to formulae (V), wherein $R_7$ is $C_1$–$C_6$-alkoxy and $R_4$ and $R_5$ are as defined in claim 1.

18. The process of claim 16, wherein the concentration of blue and red compounds taken together is from about 0.5 ppm to about 10 ppm.

19. The process of claim 16, wherein the total concentration of blue compound(s) is about 1 to 7 ppm and the concentration of red compound(s) is about 0.5 to 3 ppm.

20. The process of claim 16, wherein the compound of formula (I) is

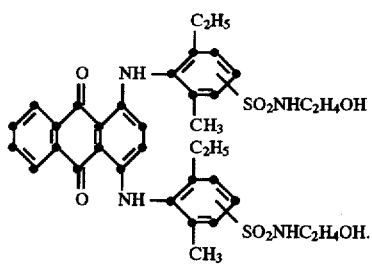

21. The process of claim 16, wherein the compound of formula (I) is

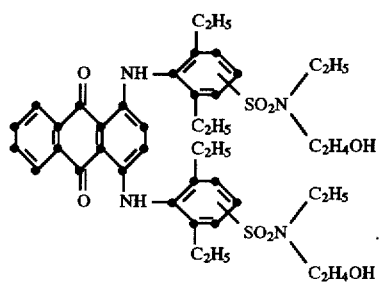

22. The process of claim 16, wherein the red compound of formula (V) is

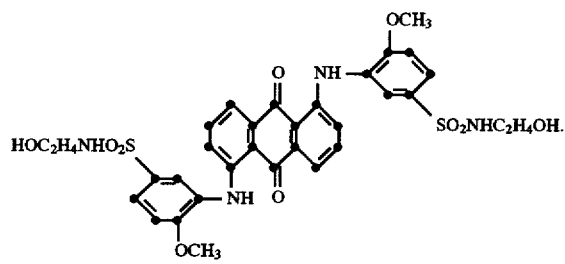

23. The process of claim 16, wherein the red compound of formula (V) is

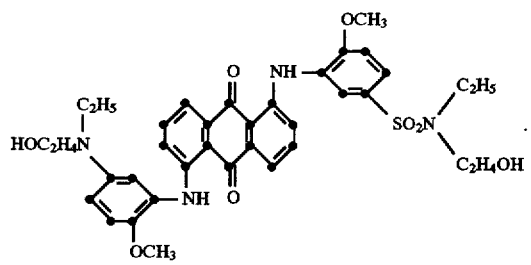

24. The process of claim 16, wherein the blue compound of formula (I) is

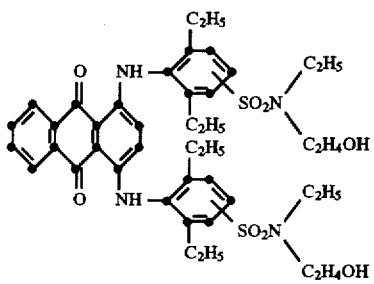

and wherein the red compound of formula (V) is

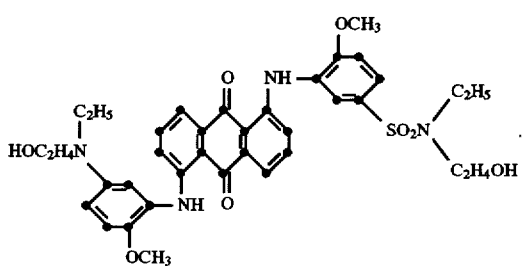

25. The process of claim 16, wherein the red compound of formula (II) is

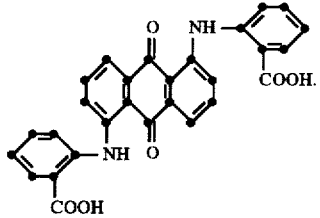

26. The process of claim 16, wherein the red compound of formula (III) is

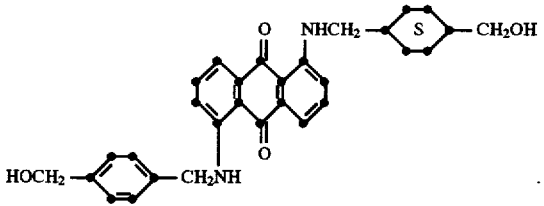

27. The process of claim 16, wherein the red compound of formula (VI) is

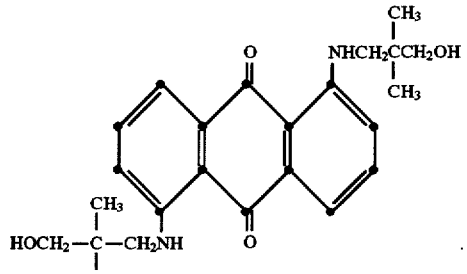

28. The process of claim 16, wherein the red compound of formula (VIII) is

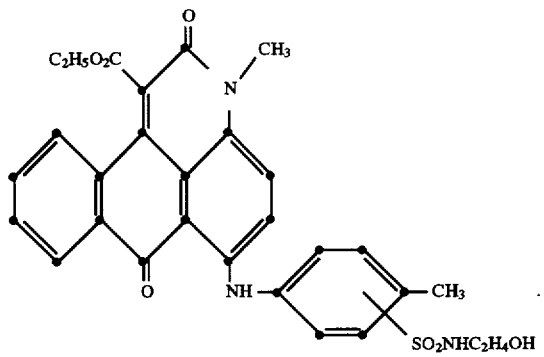

29. The polyester of claim 1, wherein said glycols comprise ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, Z,8-bis(hydroxymethyl)-tricyclo-[5.2.1.0]-decane wherein Z represents 3, 4, or 5, diethylene glycol, triethylene glycol, dipropylene glycol or tripropylene glycol.

30. The polyester of claim 29, wherein said glycol comprises ethylene glycol.

31. The polyester of claim 30, wherein said ethylene glycol is present in the amount of 65 to 100 mole percent based on the total percentages for all glycol components being 100 mole %.

32. The polyester of claim 29, wherein said glycols comprise ethylene glycol or 1,4-cyclohexanedimethanol.

33. The polyester of claim 32, wherein said polyester comprises at least about 50 mole percent ethylene glycol, 1,4-cyclohexanedimethanol or mixtures thereof.

34. The polyester of claim 1, wherein said dicarboxylic acid comprises terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid, or 2,7-naphthalenedicarboxylic acid.

35. The polyester of claim 34, wherein said dicarboxylic acid comprises an aromatic dicarboxylic acid.

36. The polyester of claim 35, wherein said aromatic dicarboxylic acid comprises terephthalic acid, isophthalic acid, or 2,6-naphthalenedicarboxylic acid.

37. The polyester of claim 36, wherein said dicarboxylic acid comprises terephthalic acid.

38. The polyester of claim 37, wherein said terephthalic acid is present in the amount of at least 50 mole % based on the total mole percentages of the acids present in the polyester being 100 mole %.

39. The polyester of claim 38, wherein said terephthalic acid is present in the amount of 75 to 100 mole % based on the total mole percentages of the acids present in the polyester being 100 mole %.

40. The polyester of claim 39, wherein said terephthalic acid is present in the amount of 90 to 100 mole % based on the total mole percentages of the acids present in the polyester being 100 mole %.

41. The polyester of claims 39 or 40, wherein said polyester further comprises 65 to 100 mole % ethylene glycol.

42. The polyester of claim 1, wherein said antimony compound is a trivalent organic antimony compound.

43. The polyester of claim 1, wherein said antimony compounds comprises tributyl antimony oxide, antimony alkoxides, $KSb(OH)_6$, $NH_4SbF_6$, $SbS_3$, antimonate esters of inorganic acids, cyclic alkyl antimonate esters, aryl antimonic acid compounds, antimony oxide, antimony trioxide, antimony halide, antimony sulfide, sodium, potassium antimonate, antimony carboxylate, antimony trioxide or antimony glycolate, and wherein said antimony carboxylate is not reacted with α-hydroxy carboxylic acids, α,β-dicarboxylic acids or derivatives thereof.

44. The polyester of claim 43, wherein said antimony compound comprises antimony carboxylate, antimony glycolate or antimony trioxide, and wherein said antimony carboxylate is not reacted with α-hydroxy carboxylic acids α,β-dicarboxylic acids or derivatives thereof.

45. The process of claim 15, wherein said glycols comprise ethylene glycol, 1,4-cyclohexanedimethanol, 1,2-propanediol, 1,3-propanediol, 1,4-butatanediol, 2,2-dimethyl-1,3-propanediol, 1,6-hexanediol, 1,2-cyclohexanediol, 1,4-cyclohexanediol, 1,2-cyclohexanedimethanol, 1,3-cyclohcxanedimethanol, Z,8-bis(hydroxymethyl)-tricyclo-[5.2.1.0]decane wherein Z represents 3, 4, or 5, diethylene glycol, triethylene glycol, dipropylene glycol or tripropylene glycol.

46. The process of claim 15, wherein said glycol comprises ethylene glycol.

47. The process of claim 46, wherein said ethylene glycol is present in the amount of 65 to 100 mole percent based on the total percentages for all glycol components being 100 mole %.

48. The process of claim 46, wherein said glycols comprise ethylene glycol and 1,4-cyclohexanedimethanol.

49. The process of claim 48, wherein said polyester comprises at least about 50 mole percent ethylene glycol, 1,4-cyclohexanedimethanol and mixtures thereof.

50. The process of claim 15, wherein said dicarboxylic acid comprises terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid and 2,6-naphthalenedicarboxylic acid or 2,7-naphthalenedicarboxylic acid.

51. The polyester of claim 50, wherein said dicarboxylic acid comprises an aromatic dicarboxylic acid.

52. The polyester of claim 51, wherein said dicarboxylic acid comprises terephthalic acid, isophthalic acid, or 2,6-naphthalenedicarboxylic acid.

53. The process of claim 52, wherein said dicarboxylic acid comprises terephthalic acid.

54. The process of claim 53, wherein said terephthalic acid is present in the amount of at least 50 mole % based on the total mole percentages of the acids present in said polyester being 100 mole %.

55. The process of claim 54, wherein said terephthalic acid is present in the amount of 75 to 100 mole % based on the total mole percentages of the acids present in said polyester being 100 mole %.

56. The process of claim 55, wherein said terephthalic acid is present in the amount of 90 to 100 mole % based on the total mole percentages of the acids present in said polyester being 100 mole %.

57. The process of claims 55 or 56, wherein said polyester further comprises 65 to 100 mole % ethylene glycol.

58. The polyester of claim 15, wherein said antimony compound is a trivalent organic antimony compound.

59. The polyester of claim 15, wherein said antimony compounds comprises tributyl antimony oxide, $KSb(OH)_6$, $NH_4SbF_6$, $SbS_3$, antimonate esters of inorganic acids, cyclic alkyl antimonate esters, aryl antimonic acid compounds, antimony oxide, antimony trioxide, antimony halide, antimony sulfide, sodium, potassium antimonate, antimony carboxylate, antimony trioxide or antimony glycolate, and wherein said antimony carboxylate is not reacted with α-hydroxy carboxylic acids, α,β-dicarboxylic acids or derivatives thereof.

60. The polyester of claim 59, wherein said antimony compound comprises antimony carboxylate, antimony glycolate, or antimony trioxide, and wherein said antimony carboxylate is not reacted with αhydroxy carboxylic acids, α,β-dicarboxylic acids or derivatives thereof.

61. The polyester of claim 15, wherein the polyester further comprises a stabilizer in the amount of about zero to about 2.8 ppm.

62. The polyester of claim 61, wherein the amount of the stabilizer is from zero to 0.1 ppm.

63. The polyester of claim 61, wherein the amount of the stabilizer is zero.

64. The process of claim 15, wherein the polyester further comprises a stabilizer in the amount of about zero to about 2.8 ppm.

65. The process of claim 64, wherein the amount of the stabilizer is from zero to 0.1 ppm.

66. The process of claim 64, wherein the amount of the stabilizer is zero.

\* \* \* \* \*

UNITED STATES PATENT AND TRADEMARK OFFICE
CERTIFICATE OF CORRECTION

PATENT NO. : 5,750,635
DATED : May 12, 1998
INVENTOR(S) : Brink et al

It is certified that error appears in the above-identified patent and that said Letters Patent is hereby corrected as shown below:

Column 20, lines 20-24 read as follows:

"$C_1$-$C_6$ alkyl, halogen, carboxy, and

but should read as follows:

"$C_1$-$C_6$ alkyl, halogen, carboxy, and $C_1$-$C_6$

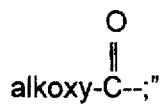

Column 28, lines 16-19 read as follows:

"$C_1$-$C_6$ alkyl, halogen, carboxy, and

UNITED STATES PATENT AND TRADEMARK OFFICE
CERTIFICATE OF CORRECTION

PATENT NO. : 5,750,635
DATED : May 12, 1998
INVENTOR(S) : Brink et al

It is certified that error appears in the above-identified patent and that said Letters Patent is hereby corrected as shown below:

but should read as follows:

"$C_1$-$C_6$ alkyl, halogen, carboxy, and $C_1$-$C_6$ $$\text{alkoxy-}\overset{\overset{\displaystyle O}{\|}}{C}-;\text{"}$$

Column 29 and 30, Structure V, that portion of the structure reading:

$$\overset{\displaystyle R}{\underset{\displaystyle }{\mid}}$$
$$SO_2\text{-}N\text{-}R_5X$$

should read:

$$SO_2\overset{R_4}{\underset{R_6X}{N}}$$

UNITED STATES PATENT AND TRADEMARK OFFICE
CERTIFICATE OF CORRECTION

PATENT NO. : 5,750,635
DATED : May 12, 1998
INVENTOR(S) : Brink et al

It is certified that error appears in the above-identified patent and that said Letters Patent is hereby corrected as shown below:

Column 31 and 32, Structure VIII, that portion of the structure reading:

$(L-N(R_4)R_5X)m$ should read:

$(L-N(R_4)R_6X)m$

UNITED STATES PATENT AND TRADEMARK OFFICE
CERTIFICATE OF CORRECTION

PATENT NO. : 5,750,635
DATED : May 12, 1998
INVENTOR(S) : Brink, et al

It is certified that error appears in the above-identified patent and that said Letters Patent is hereby corrected as shown below:

Column 31 and 32, Structure IX, that portion of the structure reading:

$(CO_2R_6)p$ should read:

$(CO_2R_5)p$

Signed and Sealed this

Sixteenth Day of February, 1999

Attest:

*Attesting Officer*

*Acting Commissioner of Patents and Trademarks*